(12) United States Patent
Kulshrestha et al.

(10) Patent No.: US 11,550,981 B2
(45) Date of Patent: Jan. 10, 2023

(54) DISTRIBUTED APPLICATION PROCESSING WITH SYNCHRONIZATION PROTOCOL

(71) Applicant: Siemens Industry Software Inc., Plano, TX (US)

(72) Inventors: Vipul Kulshrestha, Burlington, MA (US); Amit Agrawal, Waltham, MA (US)

(73) Assignee: Siemens Industry Software Inc., Plano, TX (US)

(*) Notice: Subject to any disclaimer, the term of this patent is extended or adjusted under 35 U.S.C. 154(b) by 235 days.

(21) Appl. No.: 17/007,980

(22) Filed: Aug. 31, 2020

(65) Prior Publication Data
US 2022/0067254 A1    Mar. 3, 2022

(51) Int. Cl.
| | | |
|---|---|---|
| *G06F 30/30* | (2020.01) | |
| *G06F 30/337* | (2020.01) | |
| *G06F 30/327* | (2020.01) | |
| *G06F 30/31* | (2020.01) | |
| *G06F 30/32* | (2020.01) | |
| *G06F 30/33* | (2020.01) | |
| *G06F 117/08* | (2020.01) | |

(52) U.S. Cl.
CPC ............ *G06F 30/337* (2020.01); *G06F 30/31* (2020.01); *G06F 30/32* (2020.01); *G06F 30/327* (2020.01); *G06F 30/33* (2020.01); *G06F 30/30* (2020.01); *G06F 2117/08* (2020.01)

(58) Field of Classification Search
None
See application file for complete search history.

(56) References Cited

U.S. PATENT DOCUMENTS

| 8,041,553 B1 * | 10/2011 | Hernandez ..... | G01R 31/318357 716/136 |
| 9,135,384 B1 * | 9/2015 | Santan .................. | G06F 30/327 |
| 10,671,785 B1 * | 6/2020 | Mihalache ............ | G06F 30/367 |

* cited by examiner

Primary Examiner — Leigh M Garbowski

(57) ABSTRACT

This application discloses a distributed computing system implementing multiple participating processes to separately compile different portions of a circuit design describing an electronic device over multiple phases. The distributed computing system can implement a management process to utilize a synchronization protocol to identify operational states of the participating processes during compilation of the different portions of the circuit design, maintain the operational states of the participating processes, and separately determine when the participating processes have completed compilation of the circuit design portions for one of the phases based on the operational states of the participating processes. The management process can determine to have the participating processes synchronously transition to another one of the phases or that the participating processes have compiled the circuit design into a compiled design corresponding to the circuit design, and deploy the compiled design in an emulator for verification of a functionality of the electronic device.

20 Claims, 7 Drawing Sheets

DISTRIBUTED APPLICATION PROCESSING WITH SYNCHRONIZATION PROTOCOL

TECHNICAL FIELD

This application is generally related to distributed processing and, more specifically, to distributed application processing with synchronization protocol.

BACKGROUND

Designing and fabricating electronic systems typically involves many steps, known as a "design flow." The particular steps of a design flow often are dependent upon the type of electronic system to be manufactured, its complexity, the design team, and the fabricator or foundry that will manufacture the electronic system from a design. Typically, software and hardware "tools" verify the design at various stages of the design flow by running simulators and/or hardware emulators, or by utilizing formal techniques, allowing any errors in the design discovered during the verification process to be corrected.

Initially, a specification for a new electronic system can be transformed into a logical design, sometimes referred to as a register transfer level (RTL) description of the electronic system. With this logical design, the electronic system can be described in terms of both the exchange of signals between hardware registers and the logical operations that can be performed on those signals. The logical design typically employs a Hardware Design Language (HDL), such as System Verilog or Very high speed integrated circuit Hardware Design Language (VHDL).

The logic of the electronic system can be analyzed to confirm that it will accurately perform the functions desired for the electronic system, sometimes referred to as "functional verification." Design verification tools can perform functional verification operations, such as simulating, emulating, and/or formally verifying the logical design. For example, when a design verification tool simulates the logical design, the design verification tool can provide transactions or sets of test vectors, for example, generated by a simulated test bench, to the simulated logical design. The design verification tools can determine how the simulated logical design responded to the transactions or test vectors, and verify, from that response, that the logical design describes circuitry to accurately perform functions.

For large complex electronic circuit design, such as SoC (System-on-Chip) designs or the like, software-based simulation may be too slow, as an execution speed of a simulator can drop significantly as a design size increases due to cache misses and memory swapping. Emulation and prototyping can significantly increase verification productivity by employing reconfigurable hardware modeling devices including emulators and prototyping devices based emulators and prototyping devices including programmable logic devices or Field programmable gate arrays (FPGAs) can be configured so that silicon can be utilized to implement the electronic circuit designs and perform circuit verification generally in parallel as the circuit design will execute in a real device.

In order for an emulator to implement the electronic circuit design for functional verification operations, the logical design of the electronic circuit can be synthesized from the register transfer level representation into a gate-level representation, such as a gate-level netlist. The synthesis operations can include RTL synthesis, which can generate generic gates corresponding to the functionality described in the logical circuit design. The gate-level netlist describing the electronic circuit can be compiled into a functionally-equivalent model of the gate-level netlist that, when downloaded to the programmable logic devices or FPGAs in the emulator, can cause the programmable logic devices or FPGAs in the emulator to implement the electronic circuit design described by the gate-level netlist.

Since many large complex electronic circuit designs include upwards of billions of gates, compilation of the gate-level netlist is often performed by a monolithic software application, for example, performing directed graph traversal, evaluation, dependency computations, cycle detection, graph partitioning, signal routing, or the like. Given enough time and processing resources, this compilation approach can generate a compiled file of the electronic circuit design for the emulator, but when time is of the essence, as with most competitive design flows, the compilation delay can become a bottleneck in the verification process.

SUMMARY

This application discloses a distributed computing system implementing multiple participating processes to separately compile different portions of a circuit design describing an electronic device over multiple phases. The distributed computing system can implement a management process to utilize a synchronization protocol to identify operational states of the participating processes during compilation of the different portions of the circuit design, maintain the operational states of the participating processes, and separately determine when the participating processes have completed compilation of the circuit design portions for one of the phases based on the operational states of the participating processes. The management process can determine to have the participating processes synchronously transition to another one of the phases or that the participating processes have compiled the circuit design into a compiled design corresponding to the circuit design, and deploy the compiled design in an emulator for verification of a functionality of the electronic device. Embodiments of will be described below in greater detail.

DETAILED DESCRIPTION

Illustrative Operating Environment

Figure 1:
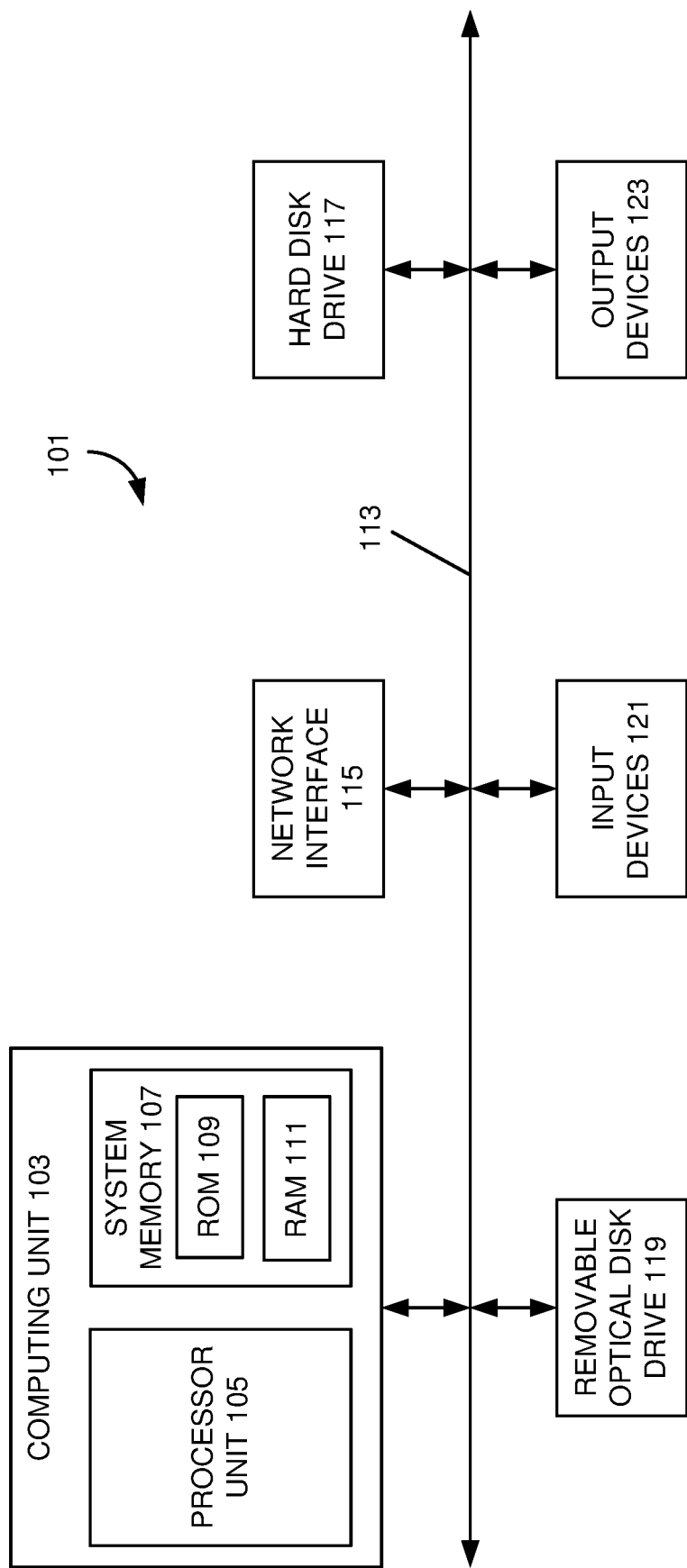
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
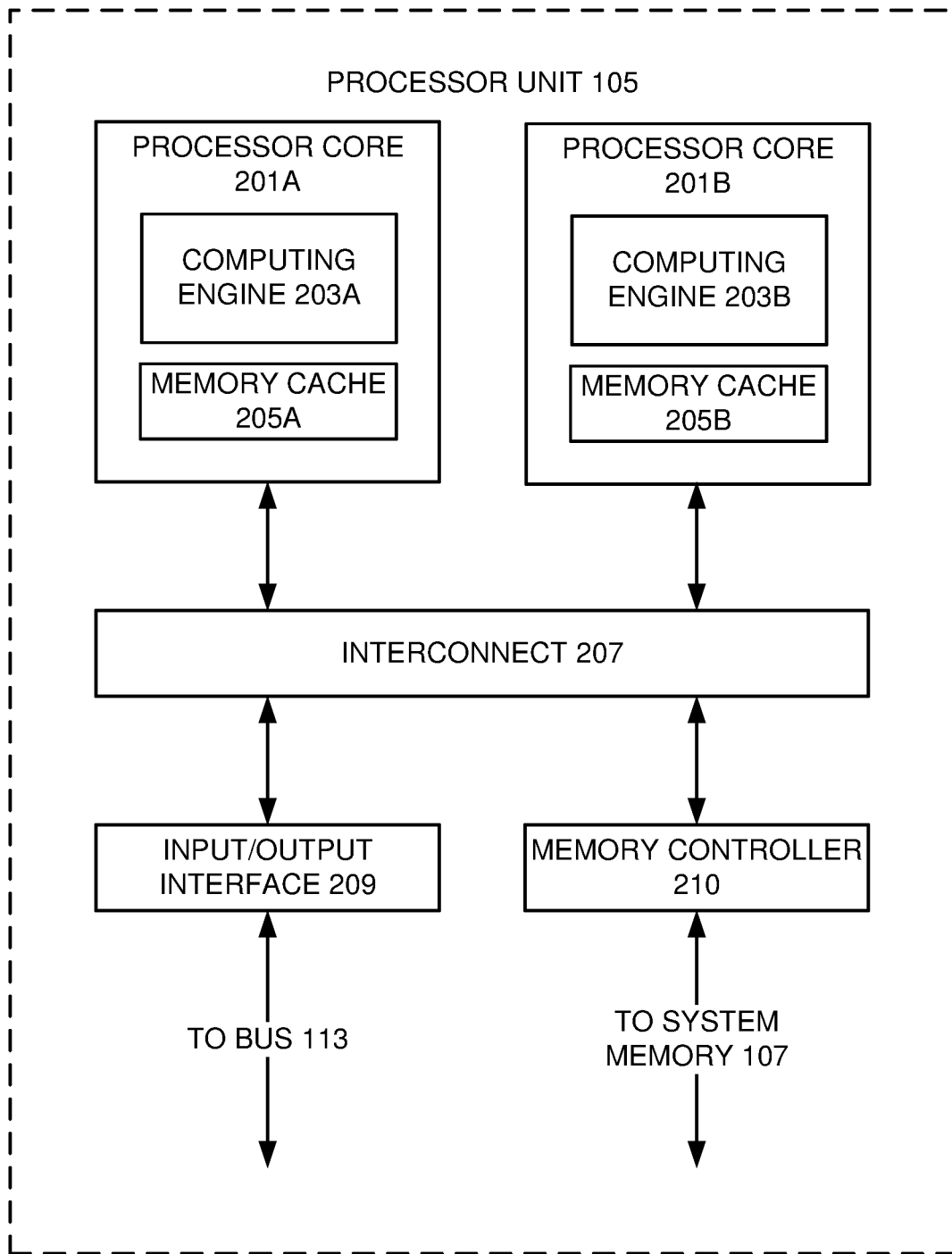

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Distributed Application Processing with Synchronization Protocol

Figure 3:
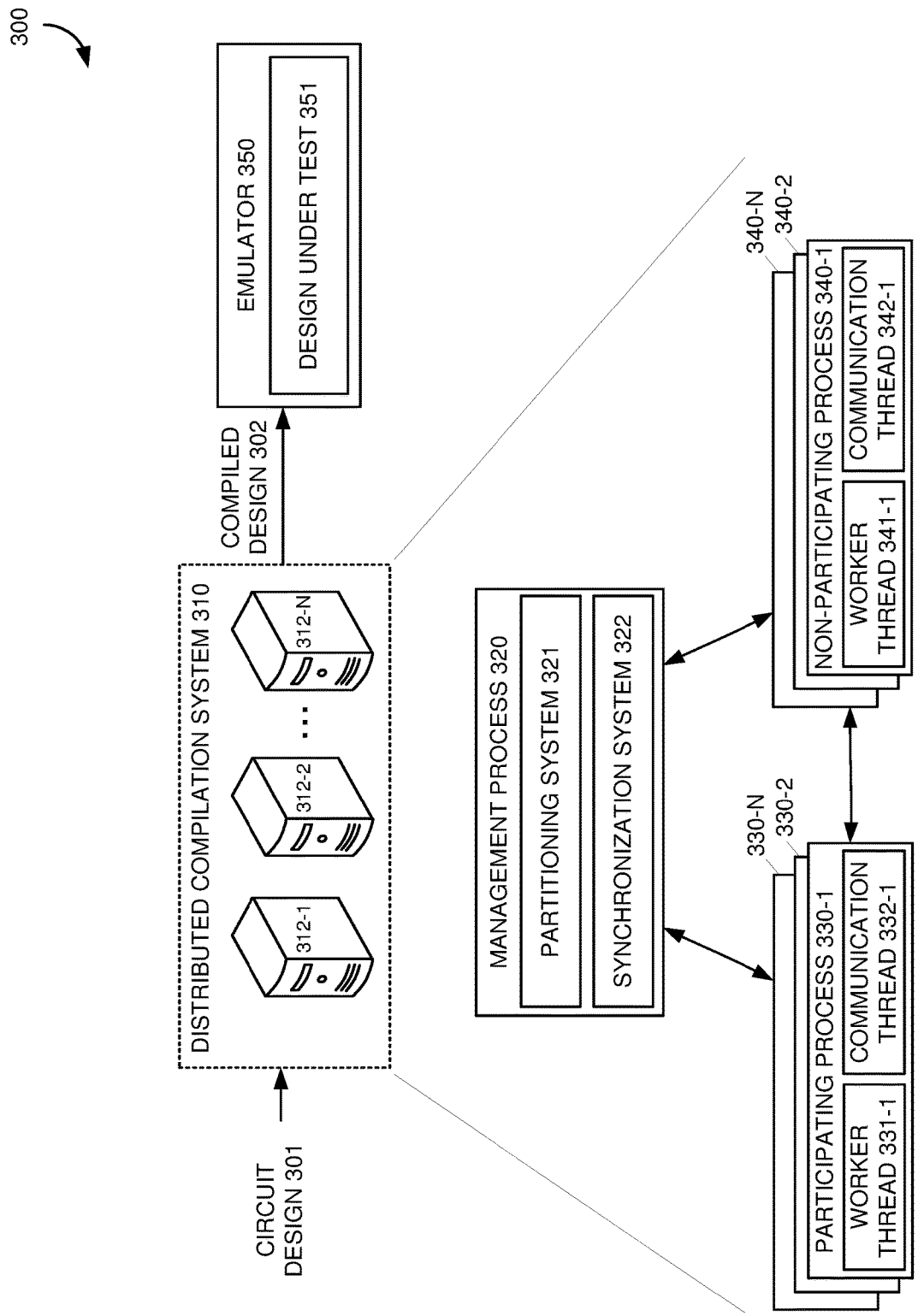
FIG. 3 illustrates an example verification system including a distributed compilation system and an emulator that may be implemented according to various embodiments.

FIG. 3 illustrates an example verification system 300 including a distributed compilation system 310 and an emulator 350 that may be implemented according to various embodiments. Referring to FIG. 3, the distributed compilation system 310 can receive a circuit design 301 describing components in an electronic device and their logical connectivity. In some embodiments, the circuit design 301 can be a gate-level netlist describing the electronic device as a collection of gate-level components and defining the connectivity between the gate-level components.

The distributed compilation system 310 can compile the circuit design 301 into a compiled design 302 for deployment in the emulator 350. The emulator 350 can utilize the compiled design 302 to configure programmable logic devices or Field Programmable Gate Arrays (FPGAs), which can implement the electronic device described by the circuit design 301 as a design under test 351 in the emulator 350. In some embodiments, the emulator 350 can perform verification operations on the design under test 351, for example, provide test stimulus, such as clock signals, activation signals, power signals, control signals, and data signals capable of prompting the design under test 351 to generate output, which can be compared to expected output of the design under test 351 in response to the test stimulus.

The distributed compilation system 310 can compile the circuit design 301 through the use of multiple distributed processes, for example, separately executed in multiple servers 312-1 to 312-N. Each of the distributed processes can accomplish tasks, for example, using sequential algorithms that perform graph traversal, graph evaluation, dependency computations, cycle detection, graph partitioning, routing, or the like, which can allow the tasks to be performed at least partially in parallel with each other.

The distributed compilation system 310 can include a management process 320 to supervise compilation performed by the multiple distributed processes in the distributed compilation system 310. The management process 320 can include a partition system 321 to identify portions of the circuit design 301 to assign to different participating processes 330-1 to 330-N in the distributed compilation system 310. The participating processes 330-1 to 330-N can each receive a portion of the circuit design 301, for example, as determined by the management process 320, and compile the assigned portions of the circuit design 301, respectively, at least partially in parallel with each other. In some embodiments, the distributed compilation system 310 also can include one or more non-participating processes 340-1 to 340-N to perform various operations, for example, global computations across the circuit design 301, generation of log files, or the like.

Since complex applications, such as the circuit design 301, can be highly integrated, partitioning can often lead to computational dependencies between separated processes, for example, data resulting from operations performed by one of the participating processes 330-1 to 330-N can be provided for use by another one of the participating processes 330-1 to 330-N. To address these dependencies, while retaining parallel process execution, the distributed compilation system 310 can implement a synchronization protocol allowing the management process 320 to oversee the compilation of the circuit design 301.

The management process 320 can include a synchronization system 322 to identify the participating processes 330-1 to 330-N and the non-participating processes 340-1 to 340-N operating in the distributed compilation system 310. The synchronization system 322 can implement the synchronization protocol, allowing the management process 320 to maintain operational states of each of the participating processes 330-1 to 330-N, for example, by exchanging state messaging with the participating processes 330-1 to 330-N. For example, the synchronization system 322 can support the synchronization protocol, which allows the participating processes 330-1 to 330-N to communicate their operational states to the management process 320. The management process 320 can utilize the operational states of the participating processes 330-1 to 330-N to identify when all of the participating processes 330-1 to 330-N have completed processing their tasks and issue an end of phase for the compilation of the circuit design 301 in the distributed compilation system 310.

In some embodiments, the compilation of the circuit design 301 or other distributed execution of a software application can be performed in multiple different phases. The participating processes 330-1 to 330-N can move across the phases in a synchronized fashion. Within each phase of compilation of the circuit design 301 or the execution of the software application, each of the participating processes 330-1 to 330-N may separately change state multiple times from a "done" state to a "working" state. For example, when a first participating process receives data from a second participating process, the first participating process can be triggered to perform further computation based on the newly received data and change its state from "done" to "working". Within each phase of compilation of the circuit design 301 or the execution of the software application, each of the participating processes 330-1 to 330-N also may separately change state multiple times from the "working" state to "done". For example, when a participating process completes its local execution and starts waiting for either more data or an "End of Phase". After all of the participating processes 330-1 to 330-N have changed to a "done" state," the management process 320 implementing the synchronization protocol can declare an "End of Phase." Based on the declaration of the "End of Phase," the participating processes 330-1 to 330-N can transition to a next phase of compilation of the circuit design 301 or other distributed execution of a software application. After the participating processes 330-1 to 330-N have entered a last phase of execution, for example, determined by the software application code, and a declaration of an "End of phase" by the management process 320 implementing the synchronization protocol occurs as a result of the participating processes 330-1 to 330-N declaring their state to be "done", allowing completion of the compilation of the circuit design 301 or other distributed execution of a software application to be performed in a synchronous fashion.

The synchronization system 322 also can authorize data message transmissions from the non-participating processes 340-1 to 340-N to the participating processes 330-1 to 330-N. The management process 320 can utilize the synchronization protocol to receive requests from the non-participating processes 340-1 to 340-N and to grant those requests by allowing the non-participating processes 340-1 to 340-N to transmit messages to the participating processes 330-1 to 330-N without interfering with an end of phase processing by the management process 320. In some embodiments, a non-participating process can send messages to a participating process by requesting the management process 320 grant a non-participating process (NPC) lock, receiving confirmation that the request was granted by the management process 320, transmitting at least one data message to the participating process while the non-participating process has the NPC lock, and then requesting the management process 320 release the NPC lock.

The participating processes 330-1 to 330-N can transmit messages to the non-participating processes 340-1 to 340-N without any required authorization from the management process 320 in the synchronization protocol. The participating processes 330-1 to 330-N also can send messages to other participating processes 330-1 to 330-N. In some embodiments, a first participating process can send a control message to a second participating process, which requests the second participating process to change state from "done" to "working." The first participating process can send a data message to the second participating process. The second participating process can request the management process 320 change the state of the second participating process from "done" to "working" based on the reception of the data message from the first participating process. The second participating process can receive an acknowledgement of the request to change state from the management process 320. The second participating process can send an acknowledgment of the data message to the first participating process, which can indicate a completion of the data message transmission protocol. When the second participating process was already in the "working" state, the first participating process can start the message transmission process with a transmission of the data message to the second participating process. In some embodiments, the second participating process can send the acknowledgement directly back to the first participating process, for example, without having to send the state change request control message to the management process 320 or wait for an acknowledgement of the state change request control message from the management process 320.

In some embodiments, the participating processes 330-1 to 330-N and the non-participating processes 340-1 to 340-N can perform operations using multiple threads. For example, the participating processes 330-1 can include a worker thread 331-1 to compile an assigned portion of the circuit design 301 and include a communication thread 332-1 to exchange data and messages with the other participating processes 330-2 to 330-N, non-participating processes 340-1 to 340-N, or the management process 320. By separating compilation tasks and communication tasks into different threads, the worker thread 331-1 can focus on performing the compilation operations without interruption due to communications with the other processes. In some embodiments, the worker thread 331-1 can be a master thread for the participating process 330-1 and the communication thread 332-1 can be a slave thread for the worker thread 331-1, meaning the worker thread 331-1 can prompt the communication thread 332-1 to transmit messages or data and not be interrupted when the communication thread 332-1 receives data or messages from a different process.

In another example, the non-participating processes 340-1 can include a worker thread 341-1 to perform tasks associated with the compilation of the circuit design 301 and include a communication thread 342-1 to exchange data and messages with the participating processes 330-1 to 330-N, the other non-participating processes 340-2 to 340-N, or the management process 320. In some embodiments, the worker thread 341-1 can be a master thread for the non-participating process 340-1 and the communication thread 342-1 can be a slave thread for the worker thread 341-1, meaning the worker thread 341-1 can prompt the communication thread 342-1 to transmit messages or data and not be interrupted when the communication thread 342-1 receives data or messages from a different process.

Although the distributed compilation system 310 has been described above as compiling a circuit design for an electronic device for deployment in an emulator, in some embodiments, the distributed processes performed by the distributed compilation system 310 can be used to execute any other software application in a distributed fashion. Even though the management process 320 has been shown as a distinct process and separate from the participating processes 330-1 to 330-N and the non-participating processes 340-1 to 340-N, in some embodiments, the management process 320 can be included be one or more of the participating processes 330-1 to 330-N or the non-participating processes 340-1 to 340-N and a communication thread corresponding to the participating processes 330-1 to 330-N or the non-participating processes 340-1 to 340-N including the management process 320 can be executing the synchronization protocol.

Figure 4:
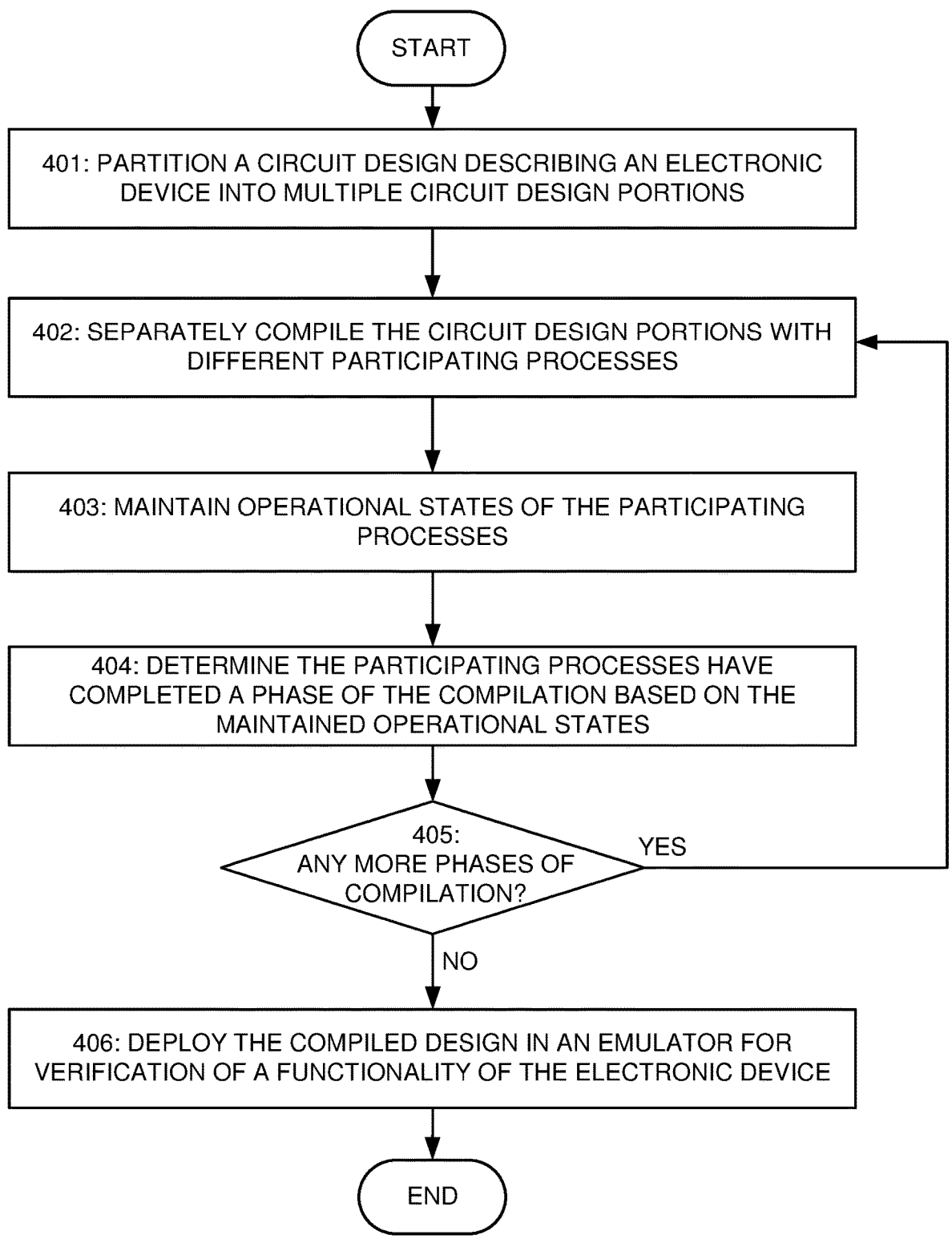
FIG. 4 illustrates a flowchart showing an example implementation of distributed application processing with synchronization protocol according to various examples.

FIG. 4 illustrates a flowchart showing an example implementation of distributed application processing with a synchronization protocol according to various examples. Referring to FIG. 4, in a block 401, a distributed computing system can include a management process to partition a circuit design describing an electronic device into multiple circuit design portions. The circuit design can describe components in the electronic device and their logical connectivity and, in some embodiments, be a gate-level netlist describing the electronic device as a collection of gate-level components and defining the connectivity between the gate-level components. The management process in the distributed computing system can identify portions of the circuit design to assign to different participating processes in the distributed computing system.

In a block 402, a plurality of participating processes in a distributed computing system can separately compile the circuit design portions with different participating processes. Each of the participating processes can accomplish tasks in furtherance of compilation of the circuit design, for example, using sequential algorithms that perform graph traversal, graph evaluation, dependency computations, cycle detection, graph partitioning, routing, or the like, which can allow the tasks to be performed at least partially in parallel with each other. Since the compilation of the circuit design portions can include computational dependencies between separated participating processes, for example, data resulting from operations performed by one of the participating processes can be provided for use by another one of the participating processes, the participating processes can transmit and receive data to each other.

In a block 403, the management process in the distributed computing system can maintain operational states of the participating processes. In some embodiments, the participating processes can request the management process for an operation state change, for example, from a "working" state to a "done" state or vice versa. The management process can grant the requests by the participating processes using messaging according to a synchronization protocol and update a record of the operational states for the requesting participating processes. Prior to all of the participating processes completing compilation of the circuit design portions, the participating processes can transition back-and-forth between the "working" state and the "done" state as compilation completes or new data arrives to re-perform at least a portion of the compilation.

In a block 404, the management process in the distributed computing system can determine the participating processes have completed a phase of the compilation of the circuit design portions based on the maintained operational states. In some embodiments, when each participating processes has an operational state recorded as being in the "done" state, the management process can determine the participating processes have completed compilation of the circuit design. In some embodiments, the participating processes may transition between a "working" state and a "done" state multiple times, for example, in response to a reception of new data triggering additional compilation during the phase or in response to a completion of compilation by that participating process. Once all of the participating processes transition into a "done" state, the management process implementing the synchronization protocol can declare an "End of Phase," prompting execution to proceed to a block 405, wherein a determination of whether any additional phases remain for the compilation or software application execution. When, in the block 405, one or more additional phases exist, execution can return to the block 402, where the participating processes synchronously transition to a next phase of compilation and begin to separately compile the circuit design portions in the next phase.

When, in the block 405, a final phase was determined to have been completed, the compilation has been completed in a synchronous fashion and execution proceeds to a block 406, where the management process in the distributed computing system can deploy the compiled design in an emulator for verification of a functionality of the electronic device. The emulator can utilize the compiled design to configure programmable logic devices or Field Programmable Gate Arrays (FPGAs), which can implement the electronic device described by the circuit design as a design under test in the emulator. In some embodiments, the emulator can perform verification operations on the design under test, for example, provide test stimulus, such as clock signals, activation signals, power signals, control signals, and data signals capable of prompting the design under test to generate output, which can be compared to expected output of the design under test in response to the test stimulus.

Figure 5:
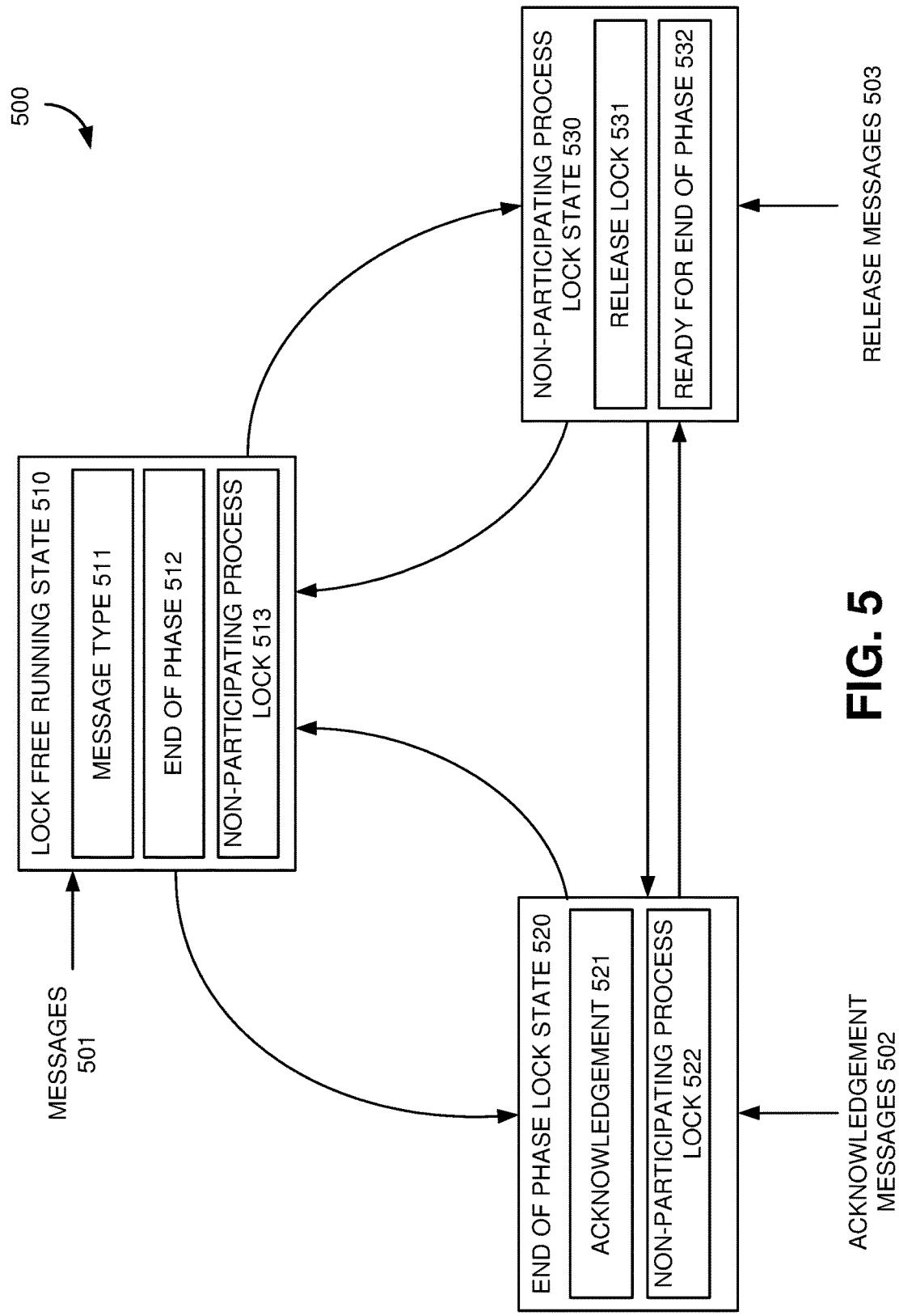
FIG. 5 illustrates an example management process state diagram used to implement a synchronization protocol according to various embodiments.

FIG. 5 illustrates an example management process state diagram 500 used to implement a synchronization protocol according to various embodiments. Referring to FIG. 5, the management process state diagram 500 can describe multiple states of a management process, which can include a lock free running state 510, an end of phase lock state 520, and a non-participating process lock state 530.

In the lock free running state 510, the management process can receive messages 501 conforming to the synchronization protocol from participating processes and non-participating processes. The management process can identify a message type 511 for the received messages 501. When the participating processes transmit state change messages, the management process can record the state of the participating processes based on the state change messages. In some embodiments, the state change messages can correspond to a transition from a "working" state, for example, a participating process performing compilation tasks, to a "done" state, for example, the participating process having completed the compilation tasks, and the management process can determine the participating processes is in the "done" state. Similarly, the state change messages 501 can correspond to a transition from a "done" state back to a "working" state, for example, after the participating process receives new data to process from another process, and the management process can determine the participating processes is in the "working" state. The message 501 can request that the management process change the state of the participating process from "done" state back to a "working" state, the management process can perform the requested state change and send an acknowledgement to the participating process. In some embodiments, the management protocol can acknowledge the state change messages from the participating processes, which confirms to the participating processes that the state change has been accepted by the management process.

The management process, in the lock free running state 510, can identify when all of the participating processes are in a "done" state and initiate an end of phase 512, for example, by generating an end of phase message for transmission to the participating processes and locking the ability of the participating processes to send data to any other process. Once all of the participating processes have sent acknowledgements to the end of phase message to the management process, the management process can send messages to free a send data lock on the participating processes. The management process, in the end of phase, can transition to the end of phase lock state 520.

When the non-participating processes transmit requests authorization to exchange messages with one or more of the participating processes, the management process in the lock free running state can identify its message type 511 and initiate a non-participating process lock 513. In some embodiments, the management process can transmit a message to the non-participating process regarding the initiation of the non-participating process lock 513, which can authorize the non-participating process to exchange messages with one or more participating processes. The management process, in response to initiating the non-participating process lock 513, can transition to the non-participating lock state 530.

In the end of phase lock state 520, the management process can determine acknowledgments 521 of the end of phase 512 in the lock free running state 510 has been made by the participating processes. For example, the management process can receive acknowledgment messages 502 in response to the end of phase message have been received from the participating processes. When all of the participating processes have acknowledged the end of phase, the management process can unlock the data and to transition back to the lock free running state 510 unless a non-participating process lock 522 has been asserted, which directs the management process to transition to the non-participating lock state 530.

In the non-participating lock state 530, the management process can receive release messages 503 from the non-participating processes. When the non-participating processes have completed exchanging messages with one or more of the participating process, the non-participating processes can transmit release messages 503. The management process can release or unlock the non-participating process lock 531 in response to the release messages 503 and transition to either the lock free running state 510 or the end of phase lock state 520. In some embodiments, the management process can determine the states of the participating processes indicate a readiness for the end of phase 532 initiate the end of phase, for example, by generating an end of phase message for transmission to the participating processes and locking the ability of the participating processes to send data to any other process, and transition to the end of phase lock state 520. Otherwise, the management process can transition to the lock free running state 510.

Figure 6:
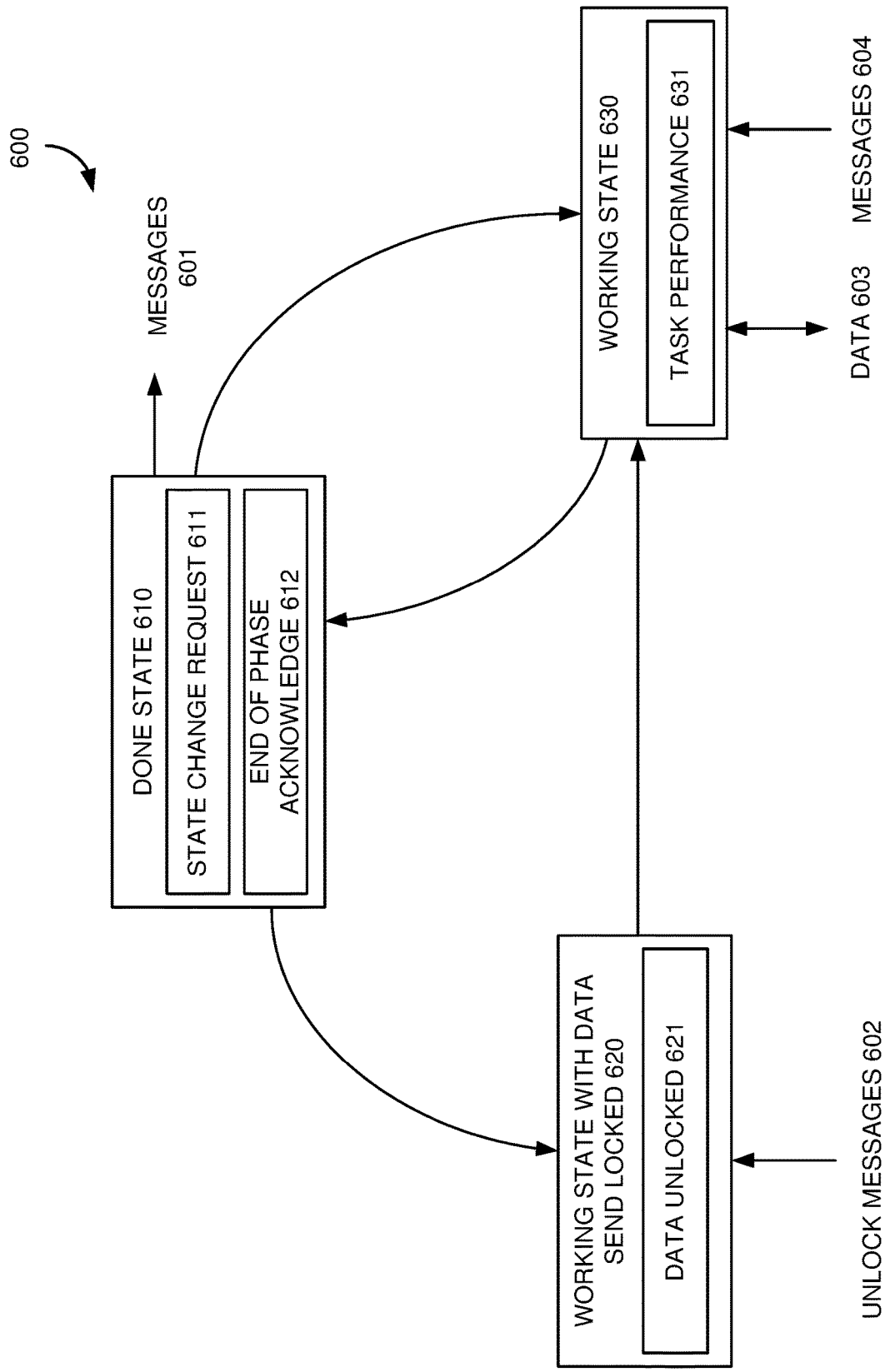
FIG. 6 illustrates an example participating process state diagram used to implement a synchronization protocol according to various embodiments.

FIG. 6 illustrates an example participating process state diagram 600 used to implement a synchronization protocol according to various embodiments. Referring to FIG. 6, the participating process state diagram 600 can describe multiple states of a participating process, which can include a done state 610, a working state with data send locked 620, and a working state 630.

In the done state 610, the participating process can transmit different types of messages 601 conforming to the synchronization protocol. In some embodiments, the participating process can determine to re-perform one or more tasks, for example, in response to a message or data from another process, and transmit a message 601 to the management process requesting a state change 611 to the working state 630. The participating process can transition to the working state 630 in response to a control message "done" to "working" received from some other participating process. The participating process also can determine to respond to an end of phase message from the management process with an acknowledgment message through an end of phase acknowledgement 612 operation, block data send operations of the participating process, and transition to the working state with data send locked 620.

In the working state with data send locked 620, the participating process can wait for the other participating processes acknowledge the end of phase message from the management process. The participating processes, in the working state with data send locked 620, can allow its worker thread to start the data computation or run algorithms, while the data send to any other process remains locked. The participating process can receive an unlock message 602 from the management process and unblock the data send operation through a data unlock 621 operation based on the unlock message 602. The participating process can transition to the working state 630 in response to the unlock message 602.

In the working state 630, the participating process can perform tasks 631 can transmit data 603 to other processes, and receive messages 604 from the other processes. When the participating process has completed their tasks, the participating process can transition to the done state 610.

Figure 7:
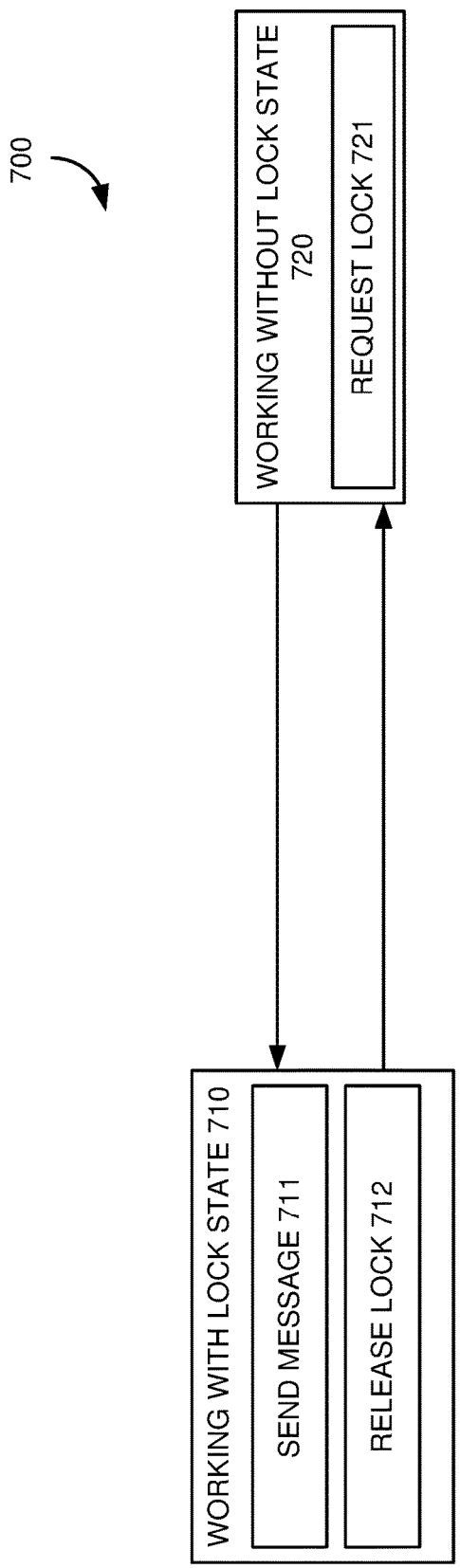
FIG. 7 illustrates an example non-participating process state diagram used to implement a synchronization protocol according to various embodiments.

FIG. 7 illustrates an example non-participating process state diagram 700 used to implement a synchronization protocol according to various embodiments. Referring to FIG. 7, the non-participating process state diagram 700 can describe multiple states of a non-participating process, which can include a working with lock state 710 and a working state without lock 720.

In the working with lock state 710, a non-participating process can send messages 711 to at least one participating process. The non-participating process also can receive data messages from the participating processes. When the non-participating process has no additional messages to send to participating process, the non-participating process can send an NPC lock release request to the management process to release the lock through a release lock 712 operation, and transition to the working state without lock 720.

In the working without lock state 720, the non-participating process can identify data messages to send to at least one participating process, for example, based on data messages received by the non-participating process. The non-participating process can request a lock 721 from the management process be granted based on the identification of the data messages to send to at least one participating process. The non-participating process can receive confirmation that the request for the lock 721 was granted by the management process and transition to the working with lock state 710.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
separately compiling, by a distributed computing system over multiple phases, different portions of a circuit design describing an electronic device with different participating processes implemented in the distributed computing system;
utilizing, by a management process implemented in the distributed computing system, a synchronization protocol to identify operational states of the participating processes during compilation of the different portions of the circuit design;
when the operational states of the participating processes indicate the compilation has been completed for one of the phases, determining, by the distributed computing system, to have the participating processes synchronously transition to another one of the phases or that the participating processes have compiled the circuit design into a compiled design corresponding to the circuit design; and
deploying, by the distributed computing system, the compiled design corresponding to the circuit design in an emulator for verification of a functionality of the electronic device.

2. The method of claim 1, wherein determining to have the participating processes synchronously transition to another one of the phases when a last phase of the compilation has not been completed.

3. The method of claim 1, wherein determining that the participating processes have compiled the circuit design into a compiled design corresponding to the circuit design after the operational states of the participating processes indicate the compilation has been completed in a last one of the phases.

4. The method of claim 1, further comprising utilizing, by the management process implemented in the distributed computing system, the synchronization protocol to authorize a non-participating process implemented in the distributed computing system to exchange one or more messages with the participating processes and locking data used in the compilation of the different portions of the circuit design by the participating processes.

5. The method of claim 1, further comprising:
partitioning, by the distributed computing system, the circuit design into the different portions of the circuit design; and
assigning, by the distributed computing system, the different portions of the circuit design to the different participating processes.

6. The method of claim 1, further comprising, when the operational states of the participating processes indicate the compilation has been completed, utilizing, by the management process in the distributed computing system, the synchronization protocol to communicate an end of phase for the compilation by the participating processes.

7. The method of claim 1, wherein each of the participating processes includes a first thread to compile at least one of the portions of the circuit design, and a second thread to communicate with other processes implemented in the distributed computing system using the synchronization protocol.

8. A system comprising:
a memory system configured to store computer-executable instructions; and
a distributed computing system, in response to execution of the computer-executable instructions, is configured to:
separately execute, over multiple phases, different portions of a software application with different participating processes implemented in the distributed computing system;
utilize, by a management process implemented in the distributed computing system, a synchronization protocol to identify operational states of the participating processes during execution of the different portions of the software application; and
synchronously transitioning execution of the different portions of the software application between the phases after the operational states of the participating processes indicate the execution has been completed for each the phases.

9. The system of claim 8, wherein the separately executed portions of the software application generates a compiled circuit design describing an electronic device, and wherein the computing system, in response to execution of the computer-executable instructions, is further configured to deploy the compiled circuit design in an emulator for verification of a functionality of the electronic device.

10. The system of claim 8, wherein the computing system, in response to execution of the computer-executable instructions, is further configured to:
partition the software application into the different portions of the software application; and
assign the different portions of the software application to the different participating processes.

11. The system of claim 8, wherein the computing system, in response to execution of the computer-executable instructions, is further configured to utilize, by the management process, the synchronization protocol to authorize a non-participating process implemented in the distributed computing system to exchange one or more messages with the participating processes.

12. An apparatus comprising at least one computer-readable memory device storing instructions configured to cause one or more processing devices in a distributed computing system to perform operations comprising:
separately compiling, over multiple phases, different portions of a circuit design describing an electronic device with different participating processes implemented in the distributed computing system;
utilizing, by a management process, a synchronization protocol to identify operational states of the participating processes during compilation of the different portions of the circuit design;
when the operational states of the participating processes indicate the compilation has been completed for one of the phases, determining to have the participating processes synchronously transition to another one of the phases or that the participating processes have compiled the circuit design into a compiled design corresponding to the circuit design; and
deploying the compiled design corresponding to the circuit design in an emulator for verification of a functionality of the electronic device.

13. The system of claim 8, wherein the computing system, in response to execution of the computer-executable instructions, is further configured to utilize, by the management process, the synchronization protocol to communicate an end of phase for the compilation by the participating processes when the operational states of the participating processes indicate the compilation has been completed.

14. The system of claim 8, wherein each of the participating processes includes a first thread to compile at least one of the portions of the software application, and a second thread to communicate with other processes implemented in the distributed computing system using the synchronization protocol.

15. The apparatus of claim 12, wherein determining that the participating processes have compiled the circuit design into the compiled design corresponding to the circuit design after the operational states of the participating processes indicate the compilation has been completed in a last one of the phases.

16. The apparatus of claim 12, wherein determining to have the participating processes synchronously transition to another one of the phases when a last phase of the compilation has not been completed.

17. The apparatus of claim 12, wherein the instructions are configured to cause one or more processing devices to perform operations further comprising utilizing, by the management process, the synchronization protocol to authorize a non-participating process implemented in the distributed computing system to exchange one or more messages with the participating processes and locking data used in the compilation of the different portions of the circuit design by the participating processes.

18. The apparatus of claim 17, wherein the instructions are configured to cause one or more processing devices to perform operations further comprising:
    partitioning the circuit design into the different portions of the circuit design; and
    assigning the different portions of the circuit design to the different participating processes.

19. The apparatus of claim 12, wherein the instructions are configured to cause one or more processing devices to perform operations further comprising, when the operational states of the participating processes indicate the compilation has been completed, utilizing, by the management process, the synchronization protocol to communicate an end of phase for the compilation by the participating processes.

20. The apparatus of claim 12, wherein each of the participating processes includes a first thread to compile at least one of the portions of the circuit design, and a second thread to communicate with other processes implemented in the distributed computing system using the synchronization protocol.

* * * * *